United States Patent Office 3,308,133
Patented Mar. 7, 1967

3,308,133
NOVEL ALKYLENE DIAMINE DERIVATIVES
Willem Jacob van der Burg, Oss, Netherlands, assignor to Organon Inc., West Orange, N.J., a corporation of New Jersey
No Drawing. Filed Jan. 11, 1963, Ser. No. 250,782
Claims priority, application Netherlands, Jan. 18, 1962, 273,727
3 Claims. (Cl. 260—296)

The invention relates to a process for the preparation of novel alkylenediamine derivatives.

In the Netherlands Patent No. 56,465 a process is described for the preparation of N-phenyl-N-aralkyl-N'N'-dimethylamine-ethylamines. These dimethylamino compounds have an anti-histaminic activity. In the said patent it is stated that the corresponding diethylamino compounds have only a weak anti-histaminic activity, from which it might be concluded that the dimethylamino structure of these compounds is essential to the relative activity and that replacement of the methyl groups by substituents with more than one carbon atom causes a reduction of activity.

From the U.S. Patent No. 2,502,151 it is known that compounds differing from the above-mentioned compounds only in that the phenyl radical has been replaced by a pyridyl or pyrimidyl radical, also have a strong anti-histaminic activity. Hence the group of compounds described in this patent is also restricted to that with a dimethyl amino grouping.

Surprisingly it has been found now that certain alkylenediamine derivatives that unlike the common dimethyl amino compounds discussed before, have no dimethyl amino grouping, exercise a very strong anti-histaminic activity and a spasmolytic activity.

The invention relates to the novel alkylene diamine derivatives of the general formula:

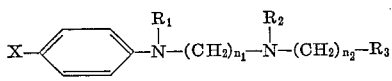

$R_1$ = a possibly substituted phenyl, benzyl, pyridyl or pyrimidyl group,
$R_2$ = hydrogen or an alkyl group,
$R_3$ = N-heterocyclic 5-, or 6-ring
$n_1$ = 2 or 3
$n_2$ = 1, 2, 3 or 4
X = hydrogen, a halogen atom, or an alkoxy group, and acid addition salts or quaternary ammonium salts thereof.

Any alkyl group occurring at one of the nitrogen atoms (substituent $R_2$) is a lower aliphatic hydrocarbon radical, preferably with 1-3 carbon atoms.

As examples of N-heterocyclic 5- and 6-ring compounds are mentioned: pyrrole, pyrrolidine, pyrazol, imidazole, triazole, pyridine, pyridazine, pyrimidine, pyrazine and piperidine.

An important group of compounds according to the invention is that of the general formula:

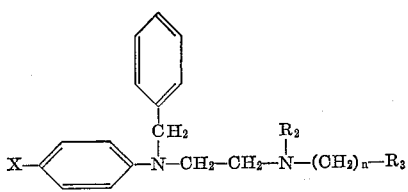

in which:
$R_2$ = hydrogen or an aliphatic hydrocarbon radical with 1-3 carbon atoms
$R_3$ = N-heterocyclic 5- or 6-ring
$n$ = 1, 2, 3 or 4
X = hydrogen, a halogen atom, or an alkoxy group, and acid addition salts of these compounds.

The compounds according to the invention can be prepared by any method known per se for the preparation of analogous compounds. One of the conventional methods consists in that a compound of the formula:

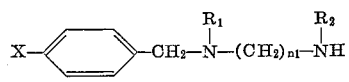

in which X, $R_1$, $R_2$ and $n_1$ have the meaning stated above, is reacted with a compound of the formula

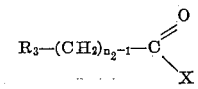

in which $n_2$ and $R_3$ have the meaning stated above and X represents a halogen atom or an alkoxy group.

For preference the relative acid chloride or the methyl ester of the relative acid is taken as starting material. The reaction takes place by dissolving the two components in a suitable solvent and heating the reaction mixture for some time. If use is made of the acid chloride, a tertiary amine, such as pyridine, is usually added. The coupling product obtained after the reaction has the grouping

Next the carbonyl group is reduced to a methylene group by any method known per se, e.g. by reduction with an alkali metal aluminium hydride, such as lithium aluminium hydride, to obtain the desired compound.

Another method consists in that the coupling reaction is performed with two components related to the compounds described above, the terminal —COX and $NR_2H$ groups having been exchanged. After coupling and reduction of the carbonyl group present in them to a methylene group the desired compound is likewise obtained.

A large number of other methods known per se can also be used for the preparation of the desired compounds. In order to convey some idea of the many possibilities a schematical survey is given below of some of the most remunerative methods leading to one of the final products according to the invention:

$$A-CH_2-CH_2-\underset{\underset{CH_3}{|}}{N}-CH_2-CH_2-B \qquad (I)$$

in which:

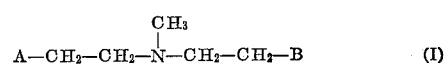
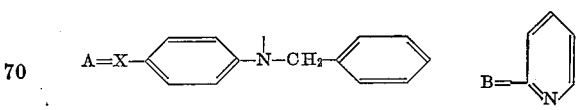

Schematical survey

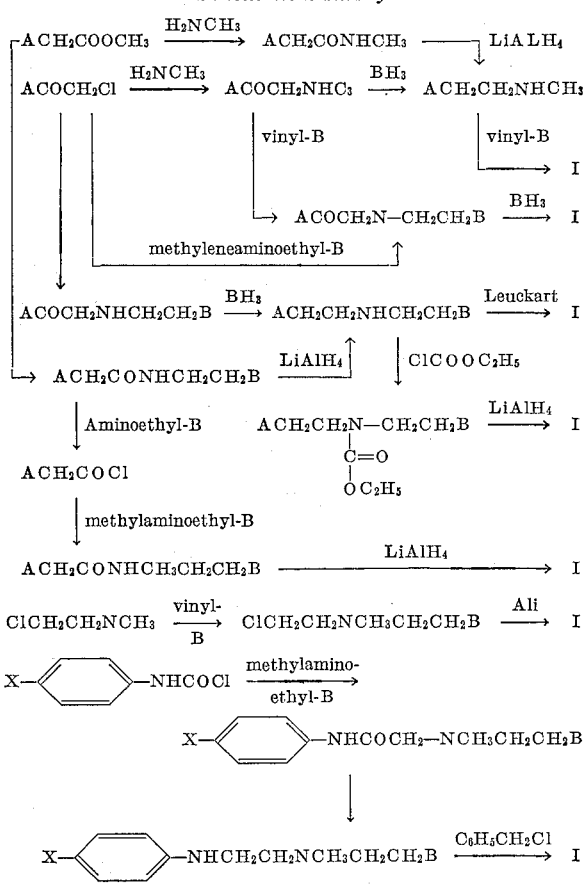

If desired the thus obtained compounds can be converted by the conventional method into the acid addition salts or quaternary ammonium salts thereof. For the formation of acid addition salts of the compounds according to the invention inorganic acids, such as the halogen hydrogen acids, or organic acids, such as succinic acid, pyruvic acid, maleic acid, picric acid, oxalic acid and citric acid, may be applied.

Irrespective of the antihistaminic activity mentioned before the compounds according to the invention have an antiserotonine effect and an effect on the central nervous system, particularly an antitremor effect.

The present novel compounds may be rendered suitable for medical administration, e.g., for oral administration, by mixing them with the conventional excipients, such as starch, magnesium stearate, talc and the like, and moulding them into pharmaceutical solid dosage unit forms, such as tablets, pills or coated tablets.

The invention is further illustrated by the following examples.

Example I 5.5 g. of histamine and 2.55 g. of N-benzyl-N-phenyl-glycine-methyl-ester were refluxed in 15 ml. of absolute methanol, in nitrogen atmosphere, for 25 hours.

After cooling down the liquid was diluted with water to 150 ml., when 2.7 g. of N-benzyl-N-phenyl-N-[(imidazolyl-4)-ethyl-2] glycinamide crystallised out. 122–124° F.

1.47 g. of the thus obtained product were passed into a solution of 1.5 g. of LiAlH₄ in 60 ml. of ether and refluxed for 21 hours. After cooling in ice 6 ml. of water were added dropwise, whereupon the solution was stirred for 30 minutes.

The inorganic matter was sucked off and washed with 20 ml. of methylene chloride.

After evaporation to dryness in vacuo the filtrate yielded 1.38 g. of N-benzyl-N-phenyl-N'[(imidazolyl-4)-ethyl-2]-ethylene-diamine. Melting point of the dihydro chloride: 161–162°; melting point of the dipicrate: 183–185°.

Example II 8.3 g. of N-benzyl-p-chloro-aniline, 20 g. of monochloroacetic acid and 16.6 g. of sodium acetate were heated in an oil-bath, for 1½ hours, at 150°. After cooling down, dilution with water, alkalization, extraction with ether and evaporation, there were obtained 7 g. of N-p-chlorophenyl-N-benzyl-glycine. 122–123° F. Esterification with methanol and sulphuric acid as a catalyst yielded 6.2 g. of N-p-chlorophenyl-N-benzyl-glycine-methyl-ester. 53–55° F.

3 g. of the resulting ester were refluxed with 6 g. of histamine in 10 ml. of methanol for 18 hours.

After dilution of the reaction mixture with water, extraction with methylene chloride, washing, drying and evaporation there were obtained 3.84 g. of oil crystallising spontaneously.

Recrystallisation from alcohol/ether yielded 3.3 g. of pure N-benzyl-N-p-chloro-phenyl-N'[(imidazolyl-4)-ethyl-2] glycinamide. 96–98° F.

This acid amide was reduced with lithium aluminium hydride as described in Example I to obtain 3.25 g. of N-(benzyl-N-p-chloro-phenyl-N'[(imidazolyl-4)-ethyl-2]-ethylene-diamine. Melting point 161–162° C.

Example III

The compound obtained in Example II was converted into the N-methyl compound in the following manners:

A. 472 mg. of free base were passed into 15 cc. of benzene, to which were added 150 mg. of sodium acetate and 10 ml. of water. This mixture was cooled down to 5° C., whereupon 3.2 ml. of a solution of 1 ml. of chloroformic acid ethyl ester in 19 ml. of benzene were added. Next the mixture was shaken for 10 minutes at 5° C. After the addition of 3 ml. of 25% ammonia the mixture was shaken again for 10 minutes, after which the water layer was removed and the benzene layer was washed with water until neutral, dried on anhydrous sodium sulfate and evaporated to dryness in vacuo.

Chromatography over 30 g. of silica gel yielded 235 mg. of the N-carbo-ethoxy compound in the form of a thick oil.

This product was dissolved in 10 ml. of absolute tetrahydrofuran, whereupon 250 mg. of LiAlH₄ were added. Next the mixture was boiled for 5 minutes and cooled in ice. The excess of LiAlH₄ was decomposed with 1 ml. of water. The precipitated inorganic substances were sucked off and the filtrate was evaporated to dryness to obtain 190 mg. of N-benzyl-N-p-chloro-phenyl-N'-methyl-N'[(imidazolyl-4)-ethyl-2]-ethylene-diamine. Melting point of the dipicrate: 201–202°.

B. This compound was also prepared in the following manner: 1.84 ml. of chloroacetyl chloride were added to 4.0 g. of N-benzyl-p-chloro-aniline dissolved in a mixture of 20 ml. of benzene and 1.5 ml. of pyridine. After stirring for 30 minutes at room temperature the reaction mixture was washed with water, dried and evaporated to dryness. After crystallisation from alcohol, 3.3 g. of N-benzyl-N-p-chloro-phenyl-chloro-acetamide were obtained. Melting point 97–98°.

This product was dissolved in 10 ml. of methanol together with 2.25 g. of N-methyl-histamine and boiled for 6 hours on water bath. After the addition of 11 ml. of 1 N NaOH and 100 ml. of benzene the reaction mixture was washed with water in order to remove the excess of N-methyl-histamine. Next, 20 ml. of 2 N HCl and 50 ml. of water were added, whereupon the mixture was shaken. The aqueous layer was filtered, alkalized with ammonia and extracted with benzene. After washing, drying and evaporation the benzene extracts yielded 1.1 g. of N-[(imidazolyl-4)-ethyl-2]-N-methyl-glycine-(N'-benzyl-N'-p-chloro-phenyl)-amide. Melting point of di maleate: 153–154°.

700 mg. of the free base were dissolved in 10 ml. of absolute tetrahydrofuran. Next, diborane was bubbled through obtained from 2 ml. of borotrifluoride-etherate and an excess of sodiumborohydride in diglyme. During this process the temperature was maintained at 40°. The reaction mixture was evaporated to dryness in vacuo and decomposed with 10 ml. of 6 N HCl by heating on a steam bath for 15 minutes. After alkalization, extraction, washing, drying and evaporation, it yielded 210 mg. of the N-methyl compound, which was identical with the compound obtained under A.

*Example IV*

A. A mixture of 2 g. of N-benzyl-N-p-chloro-phenyl-chloro-acetylamide, 6 g. of 2-(pyrazolyl-3)-ethylamine and 5 ml. of methanol were shaken for one hour and after that kept at room temperature for 2½ days.

Next, the mixture was diluted with 20 ml. of water and extracted with 100 ml. of benzene. The collected extracts were washed with water. After drying and evaporation of the washed benzene layer there remained 2.49 g. of N-[(pyrazolyl-3)-ethyl-2]-glycine-(N'-benzyl-N'-phenyl)-amide. $R_f$ (methanol-water-benzene-cyclohexane 9:1:3:7) 0.27.

The resulting product was reduced with diborane as described in Example IIIB to obtain 0.6 g. of N-benzyl-N-phenyl - N' - [(pyrazolyl-3)-ethyl-2]-ethylene-diamine; melting point of the monomaleate: 154–155°. If 3-(pyrazolyl-3)-propylamine is used, the corresponding N'-[(pyrazolyl-3)-propyl-3]-derivative is obtained.

In an analogous manner as described in Example III and the above example there have been prepared:

N-benzyl - N - phenyl - N' - methyl-N'[(pyridyl-4)-n-propyl-3]-ethylene diamine and acid addition salts thereof, and N-benzyl - N - p - fluoro-phenyl - N' - [(pyridyl-2)-n-butyl-4]-ethylene diamine and acid addition salts thereof.

B. 3 g. of N-benzyl-N-phenyl-glycine-methylester and 1 g. of 2-(pyrazolyl-3)-ethylamine were heated for 16 hours on a steam bath. The reaction product was taken up in a little alcohol, whereupon after some time the crystals formed were sucked off and washed with ether. After crystallisation from benzene there were obtained 2.5 g. of N-benzyl-N-phenyl-glycine-N'[(pyrazolyl-3)-ethyl-2]-amide; melting point: 212–223°.

This acid amide was dissolved in 60 ml. of tetrahydrofuran. Next 4.8 g. of LiAH₄ were added, whereupon the mixture was refluxed for 14 hours. The reaction mixture was worked up as described in Example I and yielded 2.27 g. of N-benzyl-N-phenyl-N'-[(pyrazolyl-3)ethyl-2]-ethyldiamine. The substance proved to be identical with the product obtained under A.

*Example V*

2 g. of N-benzyl-N-p-chloro-phenyl-chloro-acetamide, 6 g. of 2-(pyrazolyl-3)-ethylamine and 5 ml. of methanol were combined and shaken till all the solid substance had dissolved. After standing for 2½ days at room temperature the reaction mixture was worked up as described in Example IVA to obtain 2.43 g. of N'-[(pyrazolyl-3)-ethyl-2]-glycine-(N'-benzyl-N'- p-chloro-phenyl) - amide. Melting point of the monofumarate: 177–178°.

800 mg. of the free base were reduced with diborane as described in Example IIIB to obtain 540 mg. of N-benzyl-N-p-chloro - phenyl - N' - [(pyrazolyl-3)-ethyl-2]-ethylenediamine. Melting point of the monomaleate: 150.5–151.5°.

*Example VI*

A mixture of 3.6 g. of N-benzyl-N-phenyl-ethylenediamine, 1.75 g. of α-vinylpyridine, 1 ml. of glacial acetic acid and 10 ml. of absolute methanol were refluxed for 8 hours. After standing for 9 hours at room temperature the methanol was distilled off in vacuo and the mixture poured out into ice and alkalized strongly with 5 ml. of 10% NaOH. The thus obtained aqueous liquid was extracted with ether. The collected extracts were washed with a saturated ammonium-chloride solution in water, dried on sodium sulphate and evaporated to dryness in vacuo to obtain 4.97 g. of N-benzyl-N-phenyl-N'[(pyridyl-2)-ethyl-2]-ethylenediamine; melting point of the dipicrate: 155–156° and of trihydrochloride: 151–152°.

In the same manner the N-phenyl-N-p-chloro-benzyl-N'-methyl-N'-[(pyridyl-2)-ethyl-2]-ethylene-diamine was prepared. The dimaleate of this substance has a melting point of 106.5–107° C.

Further there have been prepared in an analogous way:
N - phenyl - N - p-iodo-benzyl-N'-methyl-N'-[(pyridyl-2)-ethyl-2]ethylene-diamine-mono maleate with melting point 141°–142° C., N-p-methyl-benzyl-N-p-bromo-phenyl-N'-methyl-N'-[(pyridyl-2)-ethyl - 2]ethylene - diamine and HCl addition salt thereof.

N-γ-picolyl-N-phenyl-N'-propyl-N'-[(pyridyl-2)- ethyl-2]-n-propylene-diamine and the HCl addition salts thereof, N,N-diphenyl-N'-methyl - N' - [(pyridyl-3) - ethyl-2]-ethylene-diamine-2 HCl, N-α-picolyl-N-phenyl-N'-ethyl-N'-[(pyridyl-2) - ethyl-2]-n-ethylene-diamine-3 HCl, N-p-chloro-benzyl-N-p-chloro - phenyl - N'-methyl-N'-[(pyridyl-2)-ethyl-2]ethylene diamine-2 HCl with melting point of 178°–178.5° C., and N-benzyl-N-p-methoxy-phenyl-N'-methyl-N'-[(pyridyl-2)-ethyl-2]-ethylene-diamine-mono maleate with the melting point of 112°–114° C.

In the same way the corresponding N-p-ethoxy- and N-p-propoxy-derivatives of the latter have been prepared.

*Example VII*

8.5 g. of N-benzoyl-p-bromo-aniline were converted with chloro-acetyl-chloride, in the manner described in Example IIIB, into 9 g. of N-benzyl-N-p-bromo-phenyl-chloro-acetamide (melting point: 104–105°).

This substance was converted into 6.5 g. of N-methyl-glycine-N-benzyl-N'-p-bromo-phenyl-amide with an excess of methylamine in methanol; melting point 79–81°.

This acid was converted with diborane (as in Example IIIB) into 4.3 g. of N-benzyl-N-p-bromo-phenyl-N'-methyl-ethylene-diamine. 4.3 g. of this substance were converted into 4.7 g. of N-benzyl-N-p-bromo-phenyl-N'[(pyridyl-2)-ethyl-2]-N'-methyl-ethylene-diamine. Melting point of the monomaleate 133–134°.

*Example VIII*

3 g. of N-benzyl-N-phenyl-N'-methyl-propylene-diamine (B.P. 165–170° at 0.8 mm.) were converted into the N-benzyl-N-phenyl-N'-[(pyridyl-2)-ethyl-2]-N'-methyl-propylene-diamine with 1.24 g. of vinylpyridine by the method of Example VI; melting point of the dihydrochloride: 133.5–134.5° C.

*Example IX*

The N-benzyl-N-p-chloro-phenyl-N'-[(pyridyl-2)-propyl-3]-ethylene-diamine was prepared by heating N-benzyl-N-p-chloro-phenyl-ethylene-diamine with 3-(pyridyl-2)-propionic acid-methylester. The resulting acid amide was reduced in the known manner to N-benzyl-N-p-chloro-phenyl-N'-[(pyridyl-2) - propyl - 3] - ethylene-diamine with lithium aluminium hydride.

*Example X*

N-benzyl-N-phenyl-N'-[(pyridyl-2) - ethyl-2]-N'-methyl-ethylene-diamine was prepared by linking N-benzyl-N-phenyl-N'-methyl-ethylene-diamine to α-vinylpyridine in the manner described in Example VI.

The dihydrochloride of this substance melts at 171–171.5° C.

The methiodide melts at 125–126° C.

*Example XI*

N-benzyl-N-p-chloro-phenyl-N'-methyl - N' - [(pyridyl-2)-ethyl-2]-ethylene-diamine was prepared by linking N- benzyl-N-p-chloro-phenyl-N'-methyl-ethylene-diamine to α.vinyl-pyridine. The methiodide of this compound has a melting point of 130–131° C. Melting point of the dimaleate of this compound: 114–116° C.

*Example XII*

In the same manner as described in Example VIII N-benzyl - N - phenyl - N' - (pyridyl-2)-ethyl-2]-propylene-diamine (melting point monomaleate: 117.5–118.5°) was prepared from N-benzyl-N-phenyl - propylene - diamine (boiling point 172–174°/0.8 mm).

*Example XIII*

4 g. of N-benzyl-N-p-chloro-phenyl-chloro-acetamide was passed into 20 ml. of absolute methanol, to which 20 ml. of ethylamine were added. The mixture was preserved for three days at room temperature in a closed ampoule. The reaction mixture was evaporated to dryness in vacuo and the residue taken up in ether, washed with water, dried on sodium sulphate and evaporated to obtain 3.9 g. N'-ethyl-glycine-N-benzyl-N-p-chloro-phenyl-amide. Melting point 68–70°. A sample pro analysis melts at 70–71°.

The product was reduced with diborane as described in Example IIIB to obtain 3.4 g. of N-benzyl-N-p-chloro-phenyl-N'-ethyl-ethylene-diamine. Melting point of the maleate: 159–161° C.

1.3 g. of the base were linked to vinylpyridine in the manner described in Example VI and yielded 1.83 g. of an oil. Obtained after chromatography over a column of 40 g. of aluminium-oxide: 1.05 g. of N-benzyl-N-p-chloro-phenyl-N'-[(pyridyl-2)-ethyl-2] - N' - ethyl-ethylene-diamine: melting point of the dimaleate: 103–105°.

*Example XIV*

N-benzy-N-phenyl-N' - [(imidazolyl-4)-methyl]-ethylene-diamine was prepared by heating N-benzyl-N-phenyl-ethylene-diamine and (imidazolyl-4)-methylchloride in equimolar amounts.

I claim:

1. A compound of the formula:

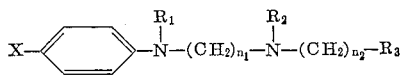

wherein:

$R_1$ is selected from the group consisting of phenyl, benzyl, pyridyl and pyrimidyl,
$R_2$ is selected from the group consisting of hydrogen and a lower alkyl,
$R_3$ is selected from the group consisting pyrazole, imidazole and pyridine,
$n_1$ is an integer selected from 2 and 3,
$n_2$ is an integer selected from 1, 2, 3, and 4,
X is selected from the group consisting of hydrogen, halogen and lower alkoxy, and
pharmaceutically acceptable acid-addition salts thereof.

2. N-p-halo-phenyl-N - benzyl-N'-methyl-N'-[(pyridyl-2)-ethyl-2]-ethylene diamine.

3. A pharmaceutically acceptable acid-addition salt of the compound of claim 2.

References Cited by the Examiner

UNITED STATES PATENTS 3,192,222   6/1965   Gross _____ 260—296

JOHN D. RANDOLPH, *Primary Examiner.*

NICHOLAS S. RIZZO, WALTER A. MODANCE,
*Examiners.*

ROBERT T. BOND, *Assistant Examiner.*